United States Patent
Buhlmann et al.

(10) Patent No.: US 10,304,574 B2
(45) Date of Patent: May 28, 2019

(54) NUCLEAR PLANT WITH A CONTAINMENT SHELL AND WITH A PRESSURE RELIEF SYSTEM

(71) Applicant: FRAMATOME GMBH, Erlangen (DE)

(72) Inventors: Sebastian Buhlmann, Offenbach A.M. (DE); Bernd Eckardt, Bruckkoebel (DE); Norbert Losch, Offenbach (DE)

(73) Assignee: Framatome GmbH, Erlangen (DE)

( * ) Notice: Subject to any disclaimer, the term of this patent is extended or adjusted under 35 U.S.C. 154(b) by 1153 days.

(21) Appl. No.: 14/593,250

(22) Filed: Jan. 9, 2015

(65) Prior Publication Data

US 2015/0243379 A1    Aug. 27, 2015

Related U.S. Application Data

(63) Continuation of application No. PCT/EP2013/063100, filed on Jun. 24, 2013.

(30) Foreign Application Priority Data

Jul. 9, 2012 (DE) .......................... 10 2012 211 897

(51) Int. Cl.
   *G21C 9/00* (2006.01)
   *G21C 9/004* (2006.01)
   (Continued)

(52) U.S. Cl.
   CPC .............. *G21C 9/004* (2013.01); *G21C 9/06* (2013.01); *G21C 13/02* (2013.01); *G21C 19/303* (2013.01); *G21C 19/317* (2013.01); *Y02E 30/31* (2013.01)

(58) Field of Classification Search
   CPC .............. G21C 9/00; G21C 9/04; G21C 9/06
   See application file for complete search history.

(56) References Cited

U.S. PATENT DOCUMENTS

| 4,698,202 A | | 10/1987 | Wachholz | |
|---|---|---|---|---|
| 5,293,413 A | * | 3/1994 | Eckardt | G21C 9/004 376/314 |
| 5,872,825 A | | 2/1999 | Eckardt | |
| 6,054,108 A | * | 4/2000 | Eckardt | B01J 35/0006 423/580.1 |

(Continued)

FOREIGN PATENT DOCUMENTS

| DE | 20109069 U1 | 8/2001 |
|---|---|---|
| DE | 102007059827 B3 | 11/2008 |

(Continued)

*Primary Examiner* — Marshall P O'Connor
(74) *Attorney, Agent, or Firm* — Laurence A. Greenberg; Werner H. Stemer; Ralph E. Locher

(57) ABSTRACT

A nuclear plant has a containment shell and a pressure relief line passing out of the containment shell and sealed by a shut-off valve, and through which a pressure relief flow can flow during relief operation, such that it is configured for particularly reliable management of critical scenarios where there is a considerable pressure increase within the containment shell at the same time as the release of hydrogen and/or carbon monoxide. A gas flow treatment device is provided upstream from the respective pressure relief line, and contains a flow duct and has a lower inflow opening and an upper inflow/outflow opening. Catalytic elements for eliminating hydrogen and/or carbon monoxide are arranged in the flow duct above the lower inflow opening. During a critical fault, the flow duct is flowed through from bottom to top by a gas mixture present in the containment shell by the principle of natural convection.

22 Claims, 3 Drawing Sheets

(51) Int. Cl.
  *G21C 9/06*     (2006.01)
  *G21C 19/317*   (2006.01)
  *G21C 13/02*    (2006.01)
  *G21C 19/303*   (2006.01)

(56) References Cited

U.S. PATENT DOCUMENTS

| | | |
|---|---|---|
| 6,942,846 B1 | 9/2005 | Eckardt et al. |
| 8,804,896 B2 | 8/2014 | Eckardt et al. |
| 2006/0188055 A1 | 8/2006 | Eckardt |
| 2010/0296619 A1 | 11/2010 | Eckardt et al. |
| 2012/0051488 A1 | 3/2012 | Eckardt |

FOREIGN PATENT DOCUMENTS

| | | |
|---|---|---|
| EP | 0964743 A1 | 12/1999 |
| JP | S6144392 A | 3/1986 |
| JP | S63289488 A | 11/1988 |
| JP | H0298689 A | 4/1990 |
| JP | H04238293 A | 8/1992 |
| JP | H04344495 A | 12/1992 |
| JP | H05203778 A | 8/1993 |
| JP | H06130170 A | 5/1994 |
| JP | 2001500261 A | 1/2001 |
| JP | 2002541462 A | 12/2002 |
| RU | 2160472 C2 | 12/2000 |
| RU | 77488 U1 | 10/2008 |
| TW | 449755 B | 8/2001 |
| UA | 107392 C2 | 12/2014 |
| WO | 9401870 A1 | 1/1994 |
| WO | 9839091 A1 | 9/1998 |

\* cited by examiner

NUCLEAR PLANT WITH A CONTAINMENT SHELL AND WITH A PRESSURE RELIEF SYSTEM

CROSS-REFERENCE TO RELATED APPLICATION

This is a continuation application, under 35 U.S.C. § 120, of copending international application No. PCT/EP2013/063100, filed Jun. 24, 2013, which designated the United States; this application also claims the priority, under 35 U.S.C. § 119, of German patent application No. DE 10 2012 211 897.7, filed Jul. 9, 2012; the prior applications are herewith incorporated by reference in their entirety.

BACKGROUND OF THE INVENTION

Field of the Invention

The invention relates to a nuclear plant having a containment shell and having at least one pressure relief line, which passes out of the containment shell and can be sealed by a shut-off valve, and through which a pressure relief flow can flow during relief operation when the shut-off valve is open.

During fault and emergency situations in nuclear power plants, comparatively large amounts of hydrogen and carbon monoxide and water vapor may be released in the safety container, also known as a containment, a confinement or a containment shell, which hermetically shields the atmosphere in the interior from the external environment.

Without counter-measures, under some circumstances it is possible for flammable gases to accumulate in the containment shell atmosphere to such an extent that they can form detonable mixtures. Further, in particular if water vapor is released from the cooling circuit, overpressures exceeding the pressure specifications of the safety enclosure may occur.

In many nuclear power plants, various systems are already installed for eliminating hydrogen and for limiting the overpressure and relieving the pressure of the containment in emergency situations. In general, systems of this type are designed, configured and set in operation independently of one another.

In this connection, the prior art includes for example catalytic elements, also known as catalytic recombiners depending on the construction, which recombine hydrogen ($H_2$) contained in a flow of gas with oxygen ($O_2$) in a catalytically driven, flameless, exothermic reaction to form water (vapor) ($H_2O$). The same applies to the recombination of carbon monoxide (CO) with oxygen ($O_2$) to form carbon dioxide ($CO_2$). For effective $H_2$/CO elimination and to prevent unacceptable, locally critical concentrations, a number of recombiners are generally arranged throughout the containment.

Further, venting systems are known, by which overpressure states can be made manageable by releasing containment atmosphere into the environment, generally with filtering. Passive systems are preferred, which are driven by the overpressure in the containment itself. However, there are also variants in which the pressure relief flow from the containment is activated or promoted by electrically-driven conveyor fans and the like.

All of the variants have pressure relief lines which pass through the containment shell and which are sealed by at least one blocking valve during normal operation of the nuclear plant. For the desired pressure relief, the respective blocking valve is opened, in such a way that the gas/vapor mixture which is at an overpressure can flow out from the interior of the containment via the pressure relief line to the outside, where it is generally released into the environment after multi-stage filtering, purification and drying to retain radioactively contaminated liquids, particles and aerosols.

In certain scenarios, considerable $H_2$ and/or CO formation combined with significant pressure build-up is possible, necessitating early pressure relief of the containment. As a result of the early pressure relief, it is conceivable that the measures for $H_2$/CO elimination in the containment will not yet have taken full effect.

Thus, in unfavorable cases, it should be assumed that ignitable $H_2$/CO concentrations are present in the vapor/air atmosphere in the pressure relief flow, also known as the vent gas flow, venting flow or vent flow for short. If the vent gas subsequently passes through non-temperature-controlled pipelines and filtering devices, the resulting vapor condensation leads to a further increase—for example doubling—in the concentrations of the flammable gases. As a result, ignitable and even detonable mixtures may be formed, which if ignited cause considerable flame accelerations which place the integrity of the exhaust and retaining devices at risk and can thus lead to highly undesirable environmental pollution and contamination if allowed to occur.

The venting systems are therefore permanently heated for example to prevent initial condensation, or else configured to be set in operation only after prior $H_2$ elimination in the containment. Recombiner systems in the containment are accordingly configured in such a way in terms of power that early $H_2$ elimination takes place using a plurality of recombiners and a largely $H_2$-free atmosphere can thus be achieved before the start of the pressure relief in a number of conceivable emergency scenarios. In addition, the recombiners thus far are predominantly arranged in the primary convection paths. Typically, a high number of for example 20 to 100 recombiners or more are provided, leading to an integral recombiner through-flow power of for example 0.3 to 0.6 or more of the total volume of the containment atmosphere per hour, referred to herein as the air exchange number. Thus for example for a containment volume of 50,000 to 70,000 $m^3$ a recombiner throughput power of 15,000 to 40,000 $m^3$/h or more is required. Nevertheless, in the aforementioned critical scenarios the $H_2$ elimination may not always be ensured in good time before the venting is introduced.

SUMMARY OF THE INVENTION

The object of the present invention is therefore to provide a nuclear plant of the type mentioned at the outset which is configured for particularly reliable management of critical scenarios where there is a considerable pressure increase within the containment shell at the same time as the release of hydrogen and/or carbon monoxide. In particular, the occurrence or accumulation of explosive gas mixtures, which can lead to rapid deflagrations or even detonations in the pressure relief lines leading out of the containment shell and in the apparatuses and auxiliary systems connected thereto, are to be countered.

Accordingly, it is provided that a gas flow treatment device, located within the containment shell, is provided upstream from the respective pressure relief line on the inlet side, and contains a chimney-like flow duct, which is enclosed by a lateral casing and which has a lower inflow opening and an upper inflow and outflow opening. A first group of catalytic elements or recombiners for eliminating hydrogen and/or carbon monoxide are arranged in the flow duct above or in the region of the lower inflow opening. The pressure relief line has an inlet mouth which is arranged above the first group of catalytic elements and below the upper inflow and an outflow opening in the casing in such a way that in the event of a fault with release of hydrogen and/or carbon monoxide in the containment shell, during convection operation preceding the relief operation, when the shut-off valve is closed the flow duct is flowed through from bottom to top by a gas mixture present in the containment shell by the principle of natural convection, and during relief operation the gas mixture flows into the flow duct from below and preferably also from above by the principle of forced overflow and flows away via the pressure relief line as a pressure relief flow.

The terms gas flow and gas mixture also include the situation where significant vapor portions or liquid portions are contained therein, thus including in an abbreviated manner the more general case of a gas/vapor mixture or a fluid flow. This convention also applies to the following description. The term shut-off valve is representative of shut-off fittings of any type.

The invention is based on the idea of systematically preventing in advance, in so far as possible, the occurrence or accumulation of explosive gas mixtures in the pressure relief line and the fittings connected thereto. So as to be able largely to omit a heating system, which counters condensate formation in these system components but is susceptible to faults and requires complex equipment, there should already be correspondingly low $H_2$ and CO concentrations in the pressure relief flow (vent gas flow) in the mouth region of the pressure relief line, and if possible already at the beginning of the relief operation. This is achieved in a surprisingly simple manner in that recombiners configured for the catalytic elimination of hydrogen and/or carbon monoxide, in particular passive autocatalytic recombiners (PARs), are placed directly upstream from the inlet mouth, also known as the withdrawal connector, of the pressure relief line in the stated manner.

By arranging and shaping the flow duct upstream from the inlet mouth of the pressure relief line, two different modes of operation and the transition between these modes are promoted in a particularly expedient manner: specifically, in the operating phase immediately preceding the relief operation, as the $H_2$/CO concentration increases, a natural convection flow directed from bottom to top comes about in the flow duct while the pressure relief line is still sealed—driven by the draught effect and by the increased catalyst temperatures at the lower chimney end due to the exothermic recombination reaction. As a result, the recombiners are preheated to some extent to the operating temperature desired in the subsequent relief operation thereof. Moreover, the convection promotes the circulation of the atmosphere inside the installation zone—and thus also the local $H_2$ elimination. The relief operation is introduced by opening the shut-off valve in the pressure relief line. As a result of the pressure gradient from the containment interior to the external environment, the gas mixture present in the containment now typically flows into the flow duct from both chimney ends—in other words from above and from below—and from there into the pressure relief line, in the manner of forced overflow. The lateral casing of the chimney forms a barrier against "downdraughts" flowing from diagonally above or horizontally, within the containment at a high $H_2$/CO concentration, which are thus prevented from directly entering the inlet mouth of the pressure relief line.

In a special case of the configuration, the flow relationships during relief operation could be balanced out in such a way that, in spite of the open upper inflow opening of the chimney-like flow duct as a result of the dynamic pressure occurring in the upper region, the inflow into the pressure relief line basically takes place merely from below via the lower inflow opening. In general, however, during relief operation portions flow into the pressure relief line from both ends.

Overall, the disclosed measures reliably prevent a critical concentration of explosive gases in the relief line and in the retaining and purifying devices connected thereto in the event of sudden withdrawal and release of gas from the safety container, even during the transient start-up phase, in a passive and automatic manner—in other words without external energy or auxiliary electrical energy being supplied and without complex regulation measures. The spontaneous flow change from convective to forced overflow operation in the chimney-like flow duct, brought about by the withdrawal, now has no effect on the efficiency of the catalysis, since the catalysts in the chimney are already at the optimum operating temperature as a result of the power operation anticipated in the pre-operation phase.

In a first advantageous variant of the idea according to the invention, a second group of catalytic elements for eliminating hydrogen and/or carbon monoxide in the flow duct are arranged above the inlet mouth of the pressure relief line and below or in the region of the upper inflow and outflow opening of the flow duct. In other words, a further zone of catalytic elements is arranged above the containment atmosphere withdrawal connection close to the upper chimney outlet. As a result, in the forced overflow withdrawal operation, it is achieved that the gases flowing into the chimney shaft from both sides—from above and from below—undergo a treatment by way of the respectively assigned catalytic recombiners before entering the pressure relief line, resulting in particularly effective depletion of the ignitable components. Further, in the preceding convection operation, this arrangement leads to strengthening of the convection flow and to particularly effective $H_2$/CO elimination (low slippage) in the gas flow treatment device.

In a second advantageous variant, through-flow limitation devices are provided in the pressure relief line, and are adjusted in relation to the recombination power of the catalytic recombiners in such a way that during relief operation the concentration of hydrogen and/or carbon monoxide in the region of the inlet mouth of the pressure relief line is less than 50%, preferably less than 30%, of the corresponding concentration in the region of the lower inflow opening of the flow duct. Alternatively, the concentration at the upper inflow and outflow opening of the flow duct may also be used as a reference value; however, it may approximately speaking be assumed that at an advantageous extension height of the flow duct of approximately 1 to 2 m the two concentrations are generally approximately equal and there is thus no significant difference.

The second variant can be combined with the first variant, but is also specifically suitable if there are no additional recombiners at the upper end of the flow duct, so as to prevent excessive suck-back/backflow of $H_2$/CO-rich environmental atmosphere into the inlet mouth of the pressure relief line via the upper inflow and outflow opening of the flow duct during relief operation.

Even when the cold filter/scrubber devices installed outside the safety container are started up, the now considerable $H_2$/CO depletion of the vent gas to less than 50%, preferably less than 30%, of the input concentration prevents critical $H_2$/CO concentrations, which might place the system integrity of the filter/scrubber devices at risk, from occurring during vapor concentration. This is of essential importance for explosion prevention during start-up, but also in continuous operation.

In accordance with the configuration principles disclosed above, the through-flow limitation devices are preferably adjusted and the shape of the flow duct selected in such a way that the mass flow occurring in the pressure relief line during relief operation is at most 100%, preferably less than 80%, of the mass flow in the flow duct during convection operation. This measure likewise serves to prevent suckback of $H_2/CO$-rich environmental atmosphere into the pressure relief line, which might otherwise occur as a result of a flow onto the catalysts exceeding the maximum possible recombination power.

In a further advantageous configuration, for the reason given previously, the through-flow limitation devices are adjusted and the shape of the flow duct selected in such a way that the flow speed onto the catalytic elements or recombiners during relief operation is less than 5 m/s, preferably less than 3 m/s.

For through-flow limitation, in particular at least one throttle may be present in the pressure relief line. The throttle may also be arranged directly in or immediately upstream from the inlet mouth of the pressure relief line. In addition or alternatively, the components connected into the pressure relief line, such as filter devices, scrubber devices, shut-off valves or individual line portions, may contribute to or bring about the desired throttle effect.

The flow in the upstream flow duct (chimney) can be influenced by way of the geometric parameters thereof such as height, cross-sectional area, size and arrangement of the inlet and outlet openings, as well as by way of flow-guiding and flow-affecting installations and the like in view of the aforementioned configuration goals.

The installations of which the shape and the arrangement affect the convection flow and the forced overflow in the flow duct include in particular the catalytic elements, which are typically formed by a plurality of plate-like elements. The catalytic elements are preferably open to the atmosphere, predominantly vertically orientated, largely parallel, and arranged at different heights (staggered) so as to produce lift between the elements and the element regions. Further, a distance of >5 mm is preferably set between the elements which are flowed over, at a height of >10 times the distance and an opening ratio of >50%. The opening ratio refers to the ratio of the cross-sectional area which can be flowed through freely between the elements to the cross-sectional area covered by all of the elements in the flow duct. In one possible variant, the catalytic elements may be arranged directly in/on the inflow/outflow opening of the flow duct.

The chimney-like flow duct may also be formed in a pipeline-shaped configuration having catalytic zones, which are open to the atmosphere, distributed on the circumference. A plurality of line strands having parallel flow may be provided.

The inlet mouth, also referred to as an atmosphere withdrawal connection, of the pressure relief line is preferably positioned differently depending on the arrangement of the catalytic recombiners in the flow duct. Thus, if there is only a low-positioned catalytic zone or portion the withdrawal connection is preferably attached in the lower part of the flow duct—but above the low-positioned catalytic portion—so as to impede, by way of the comparatively long upper flow path, a flow of $H_2/CO$-rich gas mixture into the pressure relief line via the upper inflow/outflow opening of the flow duct. In devices having two catalytic portions, specifically a low-positioned and a high-positioned catalytic portion, the withdrawal connection is preferably to be placed in the centre or in the lower part of the flow duct.

Generally, during operation permanently increased catalyst temperatures of preferably more than 100° C. to 900° C. are aimed for, and indeed achieved, by way of the exothermic reaction. In an advantageous configuration, the catalytic recombiners are configured in such a way, as regards the operating temperature thereof during relief operation, that they act as igniters at a hydrogen concentration of more than 7 vol. % in the incoming gas mixture. In other words, there is a preventative ignition of the incoming gas mixture if there are ignitable concentrations of for example 7 to 10 vol. % $H_2$ proportion, as a result of the high surface temperatures of the catalytic elements, preferably of more than 700° C. The advantage of the preventative ignition is that the ignition and the subsequent combustion take place in a comparatively controlled and moderate manner in the form of deflagration, at lower flame accelerations and volume displacements than for detonation. As a result of the ignition at the catalyst element, before the flow into the actual withdrawal system, effective concentration limitation is thus achieved in the vent system even during operating phases having a high concentration of flammable gases in the containment, in such a way that safety is now ensured particularly reliably in all operating situations in the vent system.

Advantageously, the respective gas flow treatment device and the associated vent gas withdrawal connection are arranged in the lower third, preferably in the lower quarter, in relation to the total height of the containment shell, and thus below the primary convection paths in the containment shell.

It is particularly advantageous if there are a plurality—for example 5 or more—of gas flow treatment devices for the pressure relief flow, arranged in the lower third or in the lower quarter in relation to the total height of the containment shell, and a plurality of additional catalytic recombiners for elimination of hydrogen and/or carbon monoxide, arranged above them and not acting directly on the pressure relief flow. The catalytic recombiners of the gas flow treatment devices cooperate directly with the vent system and together bring about less than 20% of the available total recombination power. In turn, the additional catalytic recombiners are preferably distributed in such a way that at least 70% of the available total recombination power is brought about in the upper half of the containment shell.

This placement and distribution of the gas flow treatment devices in the containment—in particular including in installation spaces set apart from the primary convection paths—advantageously makes possible additional systematic limitation of the hydrogen concentration in the vent gas flow, to less than ¼ to at most ½ of the average concentration in the safety container, by exploiting the resulting stratification of the hydrogen over the height of the containment.

The gas flow treatment devices are preferably placed in spatial portions of the containment which are positioned set apart from the primary convection paths. Installation spaces in the lowest third of the containment, which contain partially closed coverings and/or bases (in particular without a light grid) and walls and are ideally configured as a blind space, are found to be particularly suitable. As a result of the installation site being selected in this manner, the anticipated stratification of the hydrogen inside the upper containment portions (in other words, in the upper two thirds of the containment height) is exploited in such a way that an additional systematic limitation of the hydrogen concentration in the vent gas flow to less than ¼ to at most ½ of the average concentration in the safety container is made possible.

Further, $H_2$/CO elimination takes place by way of the further catalytic recombiners, which are arranged distributed over the containment, now preferably concentrated in the central third by height (for example >50% of the total number) and also in the upper third of the containment. As a result of this placement in the primary convection paths and the regions having a higher concentration (stratification), the $H_2$ elimination power per recombiner is again increased.

As a result of this novel arrangement, in combination with the venting withdrawal function, the total recombination power to be installed can now surprisingly also be reduced at recombiner flow-through rates of previously 15,000 to 40,000 $m^3$/h or more and at air exchange numbers of previously L>0.3 h to 0.6 h or more, to ⅔ to ½ of the level currently considered necessary, corresponding to an air exchange number which can now be achieved in the containment of L<0.3 h to 0.1 h or less. This is achieved because the $H_2$ elimination now takes place very effectively, reinforced in the high-positioned high-concentration region, generally in a vapor-inertized atmosphere. At the same time, in the case of venting the low-positioned region is safeguarded in terms of concentration by the new devices and the arrangement thereof, in such a way that a concentration reduction preceding the vent operation—so as to make safe venting possible in the first place—is no longer necessary.

In a further advantageous configuration, at least one cooling device, located inside the containment shell, for the pressure relief flow is connected into the pressure relief line.

Branching of the vent flow into a plurality of parallel sub-flows, at least some of which are cooled, may also be provided.

As a result of the vent gas withdrawal device being combined with downstream, again passively operated cooling, the temperature of the vent gas heated by the catalytic reaction is reduced from for example 400 to 500° C. to approximately 150 to 300° C. As a result, an unacceptable temperature load above the configuration can now also be prevented in the region of the containment lead-through and the downstream devices.

The cooling device is preferably installed inside the safety container primarily in the flow direction directly upstream from the containment lead-through or in the region of internal filters. The cooling device is preferably cooled convectively by the surrounding containment atmosphere or via the evaporation of a liquid. In other words, the cooling device is preferably configured for convective re-cooling by way of the gas mixture located in the containment shell and/or evaporation cooling.

If the cooling elements are arranged in the sump region or in the region of solid concrete structures, the heat transfer can be intensified by direct or indirect contact with these masses (coolant or concrete etc.), and the device can thus be made smaller for the same cooling power. As a result of passive wetting of the cooling surfaces with condensate running down from the containment, cleaning and a simultaneous increase of the effectiveness of the cooling device are achieved. As a result of the cooling surfaces being configured as dirt-proof, smooth surfaces, with radiation-resistant coatings, or else as smooth high-grade steel surfaces, optionally with additional treatment (for example polishing, electro-polishing etc.), permanently effective heat transfer is made possible even in severe fault situations. In addition, the operating safety can be greatly increased by way of arrangement behind debris protection walls.

In the region of the containment lead-through, the pressure relief line is preferably provided with a thermal insulation in the manner of a thermal protection cladding, in such a way that here too vent gas temperatures above the lead-through specification temperatures of for example 150 to 200° C. or more are made possible. This leads to the cooling device being considerably smaller.

The respective cooling device preferably contains a radiation heat exchanger part, open towards the containment, and a convection heat exchanger part.

The heat transfer from the relief flow to the surrounding coolant may take place for example via plate cooling elements having open air circulation ducts, pipe cooling elements, optionally containing ribbed pipes, gallery cooling elements, which can be adapted to the concrete structures in shape particularly favorably, and/or further heat exchanger constructions.

In principle, largely open, pressure-free flat chamber constructions are preferred, so as to minimize the constructional complexity. A modular construction by assembling a plurality of prefabricated modules is also possible. A construction is particularly advantageous in which the chimney-like flow duct containing the catalytic recombiners forms a first module and the cooling device forms a second module, the two modules preferably being installed directly side by side, in particular wall to wall.

In addition, the flow path of the vent gas in the interior of the cooling device can favorably further be sealed in a state of readiness preceding the relief operation, by way of bursting foils, which open (passively) after the shut-off valve in the pressure relief line is opened, as a result of the pressure difference which is subsequently applied.

The catalytic elements of the recombiners are preferably constructed using the catalytically active precious metals of palladium (Pd) and/or platinum (Pt) and/or vanadium (V) on ceramic substrates or metal substrates having a ceramic coating. Monometallic base materials or else mixtures of these precious metals may be used, and are optionally doped with other metals such as copper (Cu) or nickel (Ni).

So as to be able to operate safely under the most serious emergency conditions, high precious metal proportions of >0.2 wt. % of the ceramic substrate, preferably >0.5 wt. % of the ceramic substrate, based on the total catalyst including the substrate elements, are provided.

The catalytic elements may for example be arranged on metal or ceramic substrates, as ballast inside open substrates and/or, as gratings or honeycombs and the like, including for example in a sandwich construction.

An open-pore structure having an openness of >50%, preferably >90%, is preferably used, in such a way that blocking with aerosols can be reliably prevented.

As a result of this combination, ageing effects brought about by the use in the containment atmosphere, for example by sorption of hydrocarbons and welding fumes, aerosol loading etc., can be compensated over operating times of many years (>5 years, preferably >10 years), without the loss of safety-essential self-starter functionality which otherwise occurs after a short standby time, and the safety can thus be greatly increased while simultaneously reducing the costs, since cyclical replacement during maintenance and inspection work can be avoided.

Finally, in an expedient configuration, filters and/or scrubbers for cleaning the pressure relief flow and restraining activity are arranged in a portion of the pressure relief line outside the containment shell. In particular, the known wet scrubbers in the form of Venturi scrubbers may be used, which make particularly effective aerosol restraint possible, in particular in relation to iodine-containing constituents, for suitable set inflow speeds.

The advantages achieved by the invention are in particular that, as a result of the careful combination of catalytic elements or recombiners with a device for withdrawal of a vent gas stream, in the sense of a carefully tuned space and flow correlation, in particular if the flow speeds and mass flows are set appropriately, early pressure relief (venting) of the containment is made possible in spite of a significant $H_2/CO$ concentration, without placing the downstream filtering and purification devices at risk, and further the recombiner power to be installed in the containment can also be reduced. The entire pressure relief system—apart from the shut-off valves—operates completely passively without auxiliary electrical energy being supplied and substantially without moving parts. The safety in nuclear plants in serious fault situations can thus be greatly increased.

Other features which are considered as characteristic for the invention are set forth in the appended claims.

Although the invention is illustrated and described herein as embodied in a nuclear plant with a containment shell and with a pressure relief system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
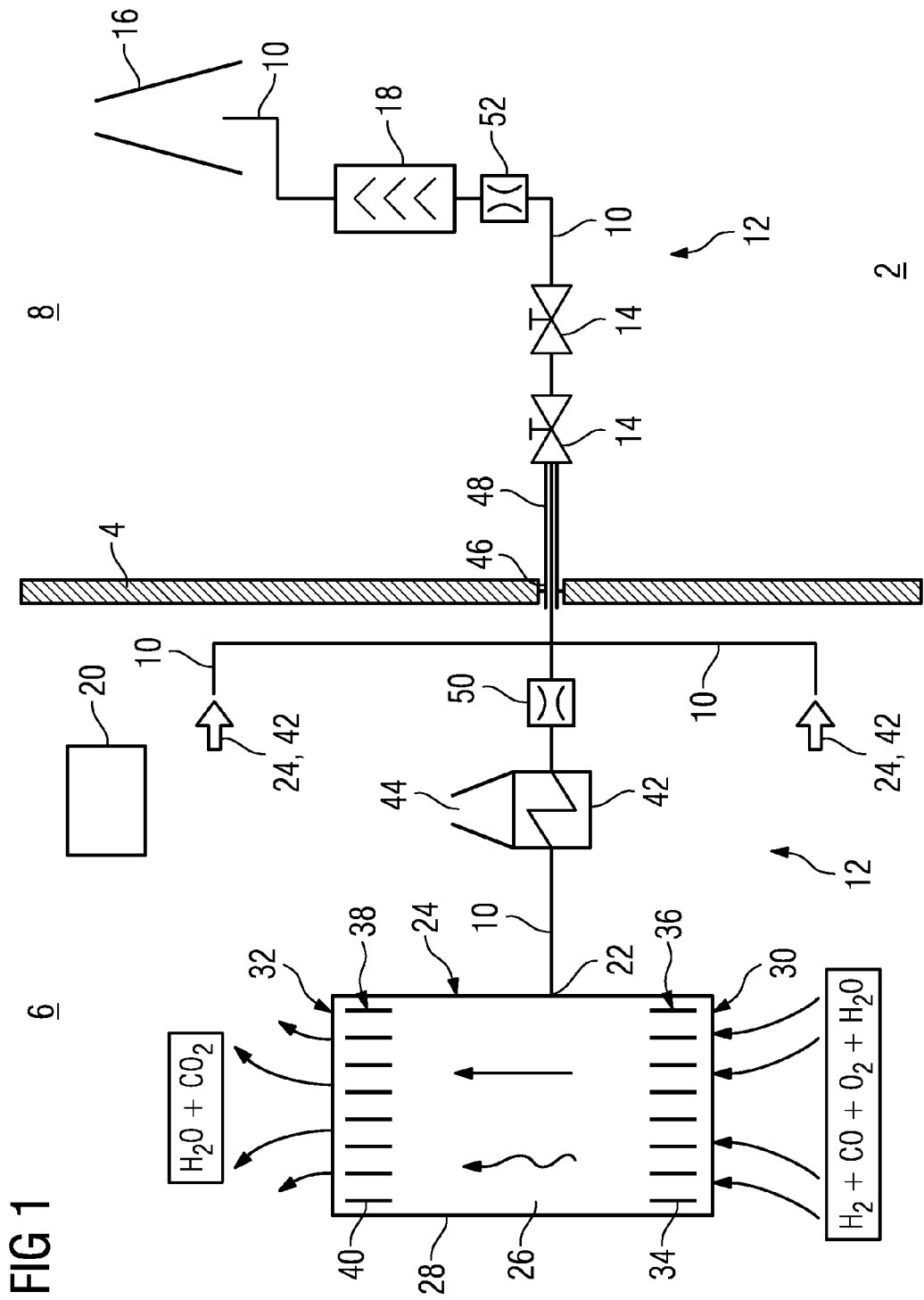
FIG. 1 is an illustration of a detail of a nuclear plant having a containment shell and a pressure relief system for the containment shell, in a first operating state, according to the invention.

Like or functionally equivalent parts are provided with like reference numerals in all of the drawings.

Referring now to the figures of the drawings in detail and first, particularly to FIG. 1 thereof, there is shown a detail of a nuclear plant 2, for example in a form of a pressurized water reactor or a boiling water reactor. The nuclear plant 2 contains a containment shell 4, also known as a containment, in this case in the form of a dome-shaped steel casing, only visible in portions. The containment shell 4 hermetically shields the nuclear and non-nuclear system components in an interior 6 from the environment in an exterior 8.

So as to be able to eliminate overpressure which occurs in the interior 6 in an emergency situation as a result of vapor and gas release, a pressure relief line 10 is passed through the containment shell 4. The pressure relief line 10 forms a component of a pressure relief system 12. During normal operation of the nuclear plant 2, the pressure relief line 10 is sealed by two shut-off valves 14, arranged outside the containment shell 4 and connected in series. To introduce the pressure relief, the two shut-off valves 14 are opened, in such a way that a pressure relief can flow, as a result of the pressure gradient from the inlet end of the pressure relief line 10 inside the containment shell 4 to the outlet end outside the containment shell 4, in this case arranged in a chimney 16. This brings about the desired pressure reduction in the interior 6 of the containment shell 4.

So as to keep the environmental pollution with radioactive decay products within acceptable limits during relief operation, the pressure relief flow is filtered and purified by a corresponding filtering and/or purification devices 18, which are connected into the pressure relief line 10 downstream from the shut-off valves 14 outside the containment shell 4. For example, wet scrubbers in the form of Venturi scrubbers may be provided, which bring about highly effective restraint of activity carriers entrained in the pressure relief flow, for example in the form of particles and aerosols. In addition, dry filters and catalytic purification devices or the like may also be provided.

The pressure relief system 12 is configured for managing critical fault situations, in which a significant release of hydrogen $H_2$ and/or carbon monoxide CO in the interior occurs at the same time as massive rise in pressure in such way that ignitable/detonable gas mixtures could occur locally or even globally without the introduction of countermeasures.

To prevent this, catalytic recombiners 20 are arranged distributed in the interior 6 of the containment shell 4 in a manner known per se, and, when flowed onto by the surrounding atmosphere, recombine hydrogen $H_2$ contained therein with oxygen $O_2$ to form water (vapor) $H_2O$ in a flameless manner, and/or correspondingly recombine carbon monoxide CO with oxygen $O_2$ to form carbon dioxide $CO_2$, which has an inertizing effect inside the containment shell 4.

However, in a critical fault situation or emergency (including core meltdown scenarios), it generally takes a short time for the recombiners 20 to reach the provided operating temperature thereof and considerable time for the projected recombination power to achieve a serious $H_2$ concentration reduction. The problem may therefore occur that, in the event of a simultaneous massive rise in pressure in the containment shell 4, a pressure relief also known as venting is required in a comparatively early period in the progression of the fault situation, in which the catalytic recombiners 20 distributed in the building have not yet provided the full effectiveness thereof.

In scenarios of this type, inflows of ignitable gas/vapor mixtures into the pressure relief line 10 could therefore occur. As a result of at least partial condensation of contained vapor in the initially comparatively cold line portions in the exterior 8, the concentrations of the safety-critical components, hydrogen $H_2$ and carbon monoxide CO, would even increase further over the further progression of the transport path. As a result, in unfavorable situations, the limit for detonability could be exceeded, with disadvantageous consequences for the integrity of the filtering and/or purification devices 18. If they were to be reliably prevented from being destroyed during events of this type, a correspondingly cost-intensive and complex, solid and safeguarded construction would be required.

To prevent this, in the pressure relief system 12 of FIG. 1 an inlet mouth 22, also known as the withdrawal connection, of the pressure relief line 10 is safeguarded to a particular extent against critical concentrations of hydrogen $H_2$ and/or carbon monoxide CO in the inflowing gas flow. For this purpose, a gas flow treatment device 24 is provided upstream from the inlet mouth 22 in terms of flow, and conditions the composition of the inflowing gas mixture.

For this purpose, the gas flow treatment device 24 contains a substantially vertically orientated flow duct 26 of a chimney-like construction, which is laterally delimited by a casing 28, for example formed by wall elements or by other system components, and is substantially impermeable to incoming gas. At the lower end, the flow duct 26 contains an inflow opening 30—arranged at the end face in this example—and a corresponding inflow and outflow opening 32 is provided at the upper end. The inlet mouth 22 of the pressure relief line 10 is arranged approximately centrally in the casing 28 in relation to the total height of the flow duct 26. Instead of a virtually point-like inlet mouth 22, an annular slit shape or the like, extending around the circumference of the casing 28 or at least part thereof, may also be provided as the inlet into the pressure relief line 10. The inlet mouth 22 may also be formed more extended than in the drawing of FIG. 1 in terms of its own vertical extension, just as long as it is ensured that the inflowing gas flow has previously passed the catalytically effective zones (see below).

Somewhat above the inflow opening 30 and below the inlet mouth 22 of the pressure relief line 10, a plurality of catalytic elements or recombiners 34, for recombining hydrogen $H_2$ with oxygen $O_2$ to form water (vapor) $H_2O$ and/or recombining carbon monoxide CO and oxygen $O_2$ to form carbon dioxide $CO_2$, are arranged distributed over the cross section of the flow duct 25 and/or at the edge over the internal circumference of the casing 28. These elements, which in the example are configured plate-shaped and arranged mutually parallel in a vertical orientation, together form a first (lower) catalytic zone 36 at the lower end of the flow duct 26. A second (upper) catalytic zone 38 of this type is arranged at the upper end of the flow duct 26, just below the inflow and outflow opening 32 and above the inlet mouth 22 of the pressure relief line 10, and contains the catalytic recombiners 40.

In an alternative variant (not shown), merely the lower catalytic zone 36 is provided. The inlet mouth 22 of the pressure relief line 10 is preferably to be positioned lower, in the lower region of the flow duct 26, but still above the catalytic recombiners 34.

Downstream from the inlet mouth 22, outside the flow duct 26 but still inside the containment shell 4, a cooling device 42 for the pressure relief flow occurring during relief operation is connected into the pressure relief line 10. The cooling device 42 is configured for predominantly convective re-cooling by the atmosphere present in the containment shell 4, and is optionally assisted by evaporation cooling and/or radiant heat emission to the environment.

For this purpose, the cooling device 42 preferably likewise forms a chimney-like flow duct 44, which is however, unlike the flow duct 26 of the gas flow treatment device 24, open in part to the environment, and through which at least one line portion of the pressure relief line 10 is passed for the purpose of the heat emission to the atmosphere which flows past. In a deviation from in the schematic drawing of FIG. 1, branching of the pressure relief line 10 into a plurality of sub-lines or sub-flows—which are however expediently brought together again before a lead-through 46 through the containment shell 4—may be provided inside the cooling device 42 or previously, further upstream. To provide the evaporation cooling, a non-illustrated liquid spraying device may be provided, for example having a flow connection to a condensate collection basin or the like.

In the region of the lead-through 46 as far as the first shut-off valve 14, the pressure relief line 10 in the embodiment is provided with a thermal protection cladding 48 formed in the manner of an external casing.

Further, one or more fixedly set or optionally adjustable or controllable elements for limiting the through-flow (limiting the amount) of the vent flow are formed in the pressure relief line 10. In this embodiment, these are in particular a first throttle valve 52 in the line portion between the cooling device 42 and the lead-through 46 through the containment shell 4 and a second throttle valve 52 in the line portion between the second shut-off valve 14 and the filtering and/or purification devices 18 arranged upstream therefrom. In principle, however, a through-flow limitation of this type may also be formed at another point in the pressure relief line 10, for example coming about by way of a corresponding configuration of flow-guiding components which are present in any case or by way of the cooperation of various components.

The mode of operation of the pressure relief system 12 is as follows.

During normal operation of the nuclear plant 2, the two shut-off valves 14 in the pressure relief line 10 are sealed, in such a way that no pressure relief flow can escape—at most a very small amount of gas can flow into the initial portion of the pressure relief line 10, until the dynamic pressure prevents further inflow. Apart from natural convection which occurs as a result of the temperature distribution in the containment shell 4, there is no further significant flow through the gas flow treatment device 24.

This changes in a fault situation with release of hydrogen $H_2$ and/or carbon monoxide CO in the containment shell 4. As a result of the catalytic elements or recombiners 34, 40 of the first (lower) and optionally the second (upper) zone, which come into action, and the resulting local temperature increase, the draught effect in the flow duct 26 is promoted and the natural convection which tends to occur there is reinforced. In other words, the flow duct 26 is flowed through from bottom to top by the gas flow which is becoming hotter, while at the same time the disclosed recombination reaction takes place and the catalytic recombiners 34, 40 reach the optimum operating temperature thereof within an extremely short time. This state is shown in FIG. 1, the flow relationships being represented by corresponding flow arrows.

Figure 2:
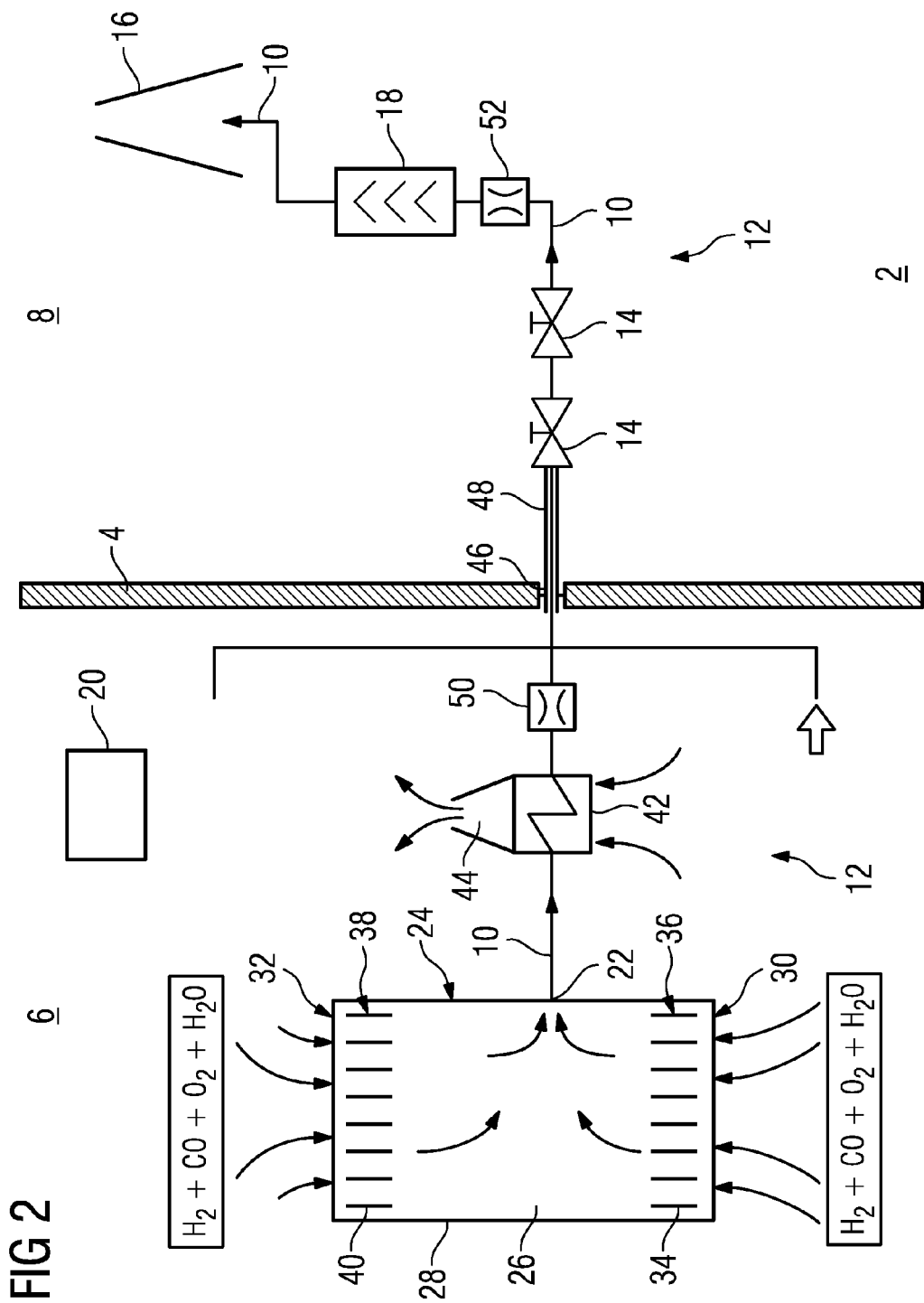
FIG. 2 is an illustration of the detail of FIG. 1 for a second operating state of the pressure relief system.

If a large overpressure builds up in the interior 6 at the same time, the overpressure elimination can be introduced after merely a short natural convection phase with preheating of the recombiners 34, 40, for example of <20 minutes, by opening the shut-off valves 24 in the pressure relief line 10. The relief operation (venting) is illustrated in relation to the prevailing flow relationships in FIG. 2. Specifically, as a result of the gas flow flowing into the pressure relief line 10 and subsequently escaping via the chimney 26, flow relationships altered from the previous natural convection occur, and may be referred to using the phrase "forced overflow". Containment atmosphere now flows into the flow duct 26 both from below and from above, is depleted in the concentration of the components $H_2$ and carbon monoxide CO in the lower catalytic zone 36 and—if present—in the upper catalytic zone 38, and subsequently, having been pre-treated in this manner, enters the pressure relief line 10 via the inlet mouth 22.

In the cooling device 42 arranged downstream, the pressure relief flow, heated as a result of the recombination reaction at the catalytic recombiners 34, 40, is cooled in the disclosed manner from for example 400 to 500° C. at the input to approximately 150 to 300° C. at the output, by predominantly convective heat emission to the containment atmosphere. This process in turn leads to a natural convection circulation of the containment atmosphere in the outer region of the cooling device 42, also indicated in FIG. 2 by flow arrows, promoted by the draught effect.

As a result of the throttle valves 50, 52, the mass flow through the pressure relief line 10 is limited in such a way that it is preferably less than 80% of the mass flow through the flow duct 26 in the natural convection operation of FIG. 1. At the same time, the inflow speed of the gas flow flowing onto the catalytic recombiners 34, 40 of the lower catalytic zone 36 and—if present—the upper catalytic zone 38 is set to less than 5 m/s by way of suitable contouring of the flow paths. In connection with this, it is achieved that the concentration of hydrogen $H_2$ and/or carbon monoxide CO in the region of the inlet mouth 22 of the pressure relief line 10 is less than 50%, preferably less than 30%, of the corresponding concentration in the region of the lower inflow opening 30 of the flow duct 26—measured still upstream from the catalytic recombiners 34 in terms of flow. As a result of these measures, in spite of the cooling of the pressure relief flow in the cooling device 42 and in the downstream system components and in spite of the possible linked partial condensation of contained vapor components, detonable critical explosive gas mixtures are prevented from accumulating in the downstream portions of the pressure relief line 10. Thus, in particular, a risk to the integrity of the filtering and purification devices 18 arranged outside the containment shell is prevented.

A plurality of gas flow treatment devices 24 and associated pressure relief lines 10 of the pressure relief system 12 are preferably arranged in the lower third of the total height of the containment shell 4. As is indicated schematically in FIGS. 1 and 2, a plurality of pressure relief lines 10 may further be brought together inside the containment shell 4, so as to keep the number of lead-throughs 46 low. The additional catalytic recombiners 20, which do not act directly on the pressure relief flow, are preferably arranged at a greater height inside the containment shell 4, in particular in the central and also in the upper third.

Figure 3:
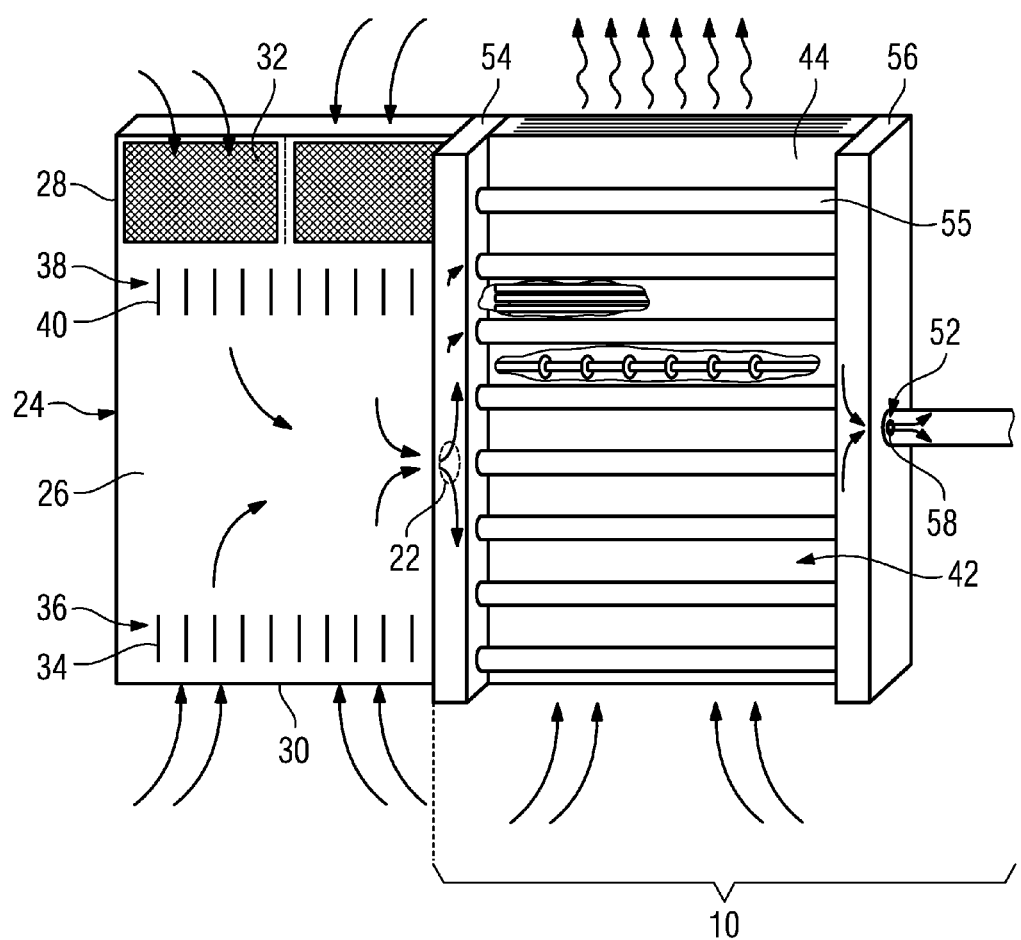
FIG. 3 is a diagrammatic, perspective view, in section in part, of a treatment device equipped with catalytic recombiners and a downstream cooling device for a pressure relief flow as components of the pressure relief system according to FIGS. 1 and 2.

FIG. 3 shows a variant of the gas flow treatment device 24 along with a downstream cooling device 42, which is implemented in a modular chest construction. The drawn-in flow arrows characterize the flow field during relief operation. Between the two modules, there is a chest-like entry collector 54, which distributes the gas mixture, entering via the inlet mouth 22 from the flow duct 26 having the catalytic recombiners 34, 40 and depleted in $H_2$/CO concentration, into the pipelines 55 of the cooling device 42, which are connected in parallel. The pipelines 55 may be configured as ribbed pipes or be provided with plate elements and the like which can be flowed through, as is indicated by the detailed example enclosed in wavy lines. Accordingly, the parallel sub-flows are subsequently reunited by the chest-like exit collector 56. A radiant heat field, which is formed in the upper region of the cooling device 42 and through which—as well as the convective heat transport via the containment atmosphere—heat is also transported away by the vent gas flow guided in the pipelines 55, is shown by wavy arrows. A through-flow limitation, by way of the pressure relief line denoted as a whole as 10, is in this case provided by way of example by a throttle valve 50 configured as an annular orifice 58, which is arranged in the transition from the exit collector 56 to the outgoing pipeline part leading to the containment lead-through.

The following is a summary list of reference numerals and the corresponding structure used in the above description of the invention:

2 nuclear plant
4 containment shell
6 interior
8 exterior
10 pressure relief line
12 pressure relief system
14 shut-off valve
16 chimney
18 filtering and purification device
20 catalytic recombiner
22 inlet mouth
24 gas flow treatment device
26 flow duct
28 casing
30 inflow opening
32 inflow and outflow opening
34 catalytic element
36 lower catalytic zone
38 upper catalytic zone
40 catalytic element
42 cooling device
44 flow duct
46 lead-through
48 thermal protection cladding
50 throttle valve
52 throttle valve
54 entry collector
55 pipeline
56 exit collector
58 annular orifice
CO carbon monoxide
$CO_2$ carbon dioxide
$H_2$ hydrogen
$H_2O$ water
$O_2$ oxygen

The invention claimed is:

1. A nuclear plant, comprising:
a containment shell;
a shut-off valve disposed outside of said containment shell;
at least one pressure relief line passing out of said containment shell and sealed by said shut-off valve, and through said pressure relief line a pressure relief flow can flow during relief operation when said shut-off valve is open, said pressure relief line having an inlet mouth;
a gas flow treatment device, disposed within said containment shell, and disposed upstream from said pressure relief line on an inlet side, said gas flow treatment device having a lateral casing and a chimney-shaped flow duct, enclosed by said lateral casing, and having a lower inflow opening and an upper inflow and outflow opening formed therein, said gas flow treatment device disposed upstream from said shutoff valve; and
a first group of catalytic elements for eliminating at least one of hydrogen or carbon monoxide disposed in said chimney-shaped flow duct above or in a region of said lower inflow opening, and said inlet mouth of said pressure relief line disposed above said first group of catalytic elements and below said upper inflow and outflow opening in said lateral casing such that in an event of a critical fault or emergency with release of at least one of the hydrogen or the carbon monoxide in said containment shell, during convection operation preceding the relief operation, when said shut-off valve is closed said chimney-shaped flow duct is flowed through from bottom to top by a gas mixture present in said containment shell by a principle of natural convection, and during the relief operation the gas mixture flows into said chimney-shaped flow duct from below and from above by a principle of forced overflow and flows away via said pressure relief line as the pressure relief flow.

2. The nuclear plant according to claim 1, further comprising a second group of catalytic elements for eliminating at least one of the hydrogen or the carbon monoxide in said chimney-shaped flow duct and disposed above said inlet mouth of said pressure relief line and below or in a region of said upper inflow and outflow opening of said chimney-shaped flow duct.

3. The nuclear plant according to claim 2, further comprising a through-flow limitation device disposed in said pressure relief line, and adjusted in relation to a power of said first and second group of catalytic elements such that during the relief operation a concentration of at least one of the hydrogen or the carbon monoxide in a region of said inlet mouth of said pressure relief line is less than 50% of a corresponding concentration in the region of said lower inflow opening of said chimney-shaped flow duct.

4. The nuclear plant according to claim 3, wherein said through-flow limitation device is adjusted and a shape of said chimney-shaped flow duct selected in such a way that a mass flow occurring in said pressure relief line during the relief operation is at most 100% of a mass flow in said chimney flow duct during the convection operation.

5. The nuclear plant according to claim 3, wherein said through-flow limitation device is adjusted and a shape of said chimney-shaped flow duct selected in such a way that a flow speed onto said first and second groups of catalytic elements during the relief operation is less than 5 m/s.

6. The nuclear plant according to claim 2, wherein said first and second groups of catalytic elements are configured in such a way, as regards an operating temperature thereof during the relief operation, that said first and second groups of catalytic elements act as igniters at a hydrogen concentration of more than 7 vol. % in an incoming gas mixture.

7. The nuclear plant according to claim 1, wherein said gas flow treatment device is disposed in a lower third, in relation to a total height of said containment shell.

8. The nuclear plant according to claim 1, wherein said gas flow treatment device is disposed set apart from primary convection paths in a region of low hydrogen concentration in partially enclosed spaces.

9. The nuclear plant according to claim 7,
wherein said gas flow treatment device is one of a plurality of gas flow treatment devices for the pressure relief flow, disposed in the lower third in relation to the total height of said containment shell;
further comprising a plurality of catalytic recombiners, disposed positioned above and not acting directly on the pressure relief flow, for eliminating at least one of the hydrogen or the carbon monoxide; and
wherein said gas flow treatment devices together bring about less than 20% of a total available recombination power.

10. The nuclear plant according to claim 1, wherein an air exchange number in said containment shell of L <0.3 h is achieved during the convection operation.

11. The nuclear plant according to claim 1, further comprising a cooling device, disposed inside said containment shell, for the pressure relief flow and is connected into said pressure relief line.

12. The nuclear plant according to claim 11, wherein said cooling device is configured for convective re-cooling by way of the gas mixture located in said containment shell and/or by evaporation cooling.

13. The nuclear plant according to claim 11, wherein said cooling device is configured, in terms of cooling power thereof, to cool the pressure relief flow from an input temperature in a range of approximately 400 to 500 ° C. to an output temperature in a range of approximately 150 to 300 ° C.

14. The nuclear plant according to claim 1, wherein said containment shell has a lead-through and said pressure relief line has a thermal protection cladding in a region of said lead-through through said containment shell.

15. The nuclear plant according to claim 1, wherein said first group of catalytic elements is constructed from palladium, on metal substrates having a ceramic coating, and said first group of catalytic elements contain a precious metal proportion of more than 0.2 wt. % based on said substrates.

16. The nuclear plant according to claim 1, further comprising at least one of filters or scrubbers for purifying the pressure relief flow and for activity re-cooling and disposed in a portion of said pressure relief line disposed outside of said containment shell.

17. The nuclear plant according to claim 2, further comprising a through-flow limitation device disposed in said pressure relief line, and adjusted in relation to a power of said first and second group of catalytic elements such that during the relief operation a concentration of at least one of the hydrogen or the carbon monoxide in a region of said inlet mouth of said pressure relief line is less than 30% of a corresponding concentration in the region of said lower inflow opening of said chimney-shaped flow duct.

18. The nuclear plant according to claim 3, wherein said through-flow limitation device is adjusted and a shape of said chimney-shaped flow duct selected in such a way that a mass flow occurring in said pressure relief line during the relief operation is less than 80% of a mass flow in said chimney-shaped flow duct during convection operation.

19. The nuclear plant according to claim 1, wherein an air exchange number in said containment shell of L <0.1 h is achieved during the convection operation.

20. The nuclear plant according to claim 1, wherein said first group of catalytic elements is constructed from palladium on metal substrates having a ceramic coating, and said first group of catalytic elements contain a precious metal proportion of more than 0.5 wt. % based on said substrates.

21. The nuclear plant according to claim 1, wherein said first and second groups of catalytic elements are constructed from at least one precious metal selected from the group consisting of palladium, platinum, and vanadium on at least one of ceramic substrates or on metal substrates having a ceramic coating, and said first and second groups of catalytic elements contain a precious metal proportion of more than 0.2 wt. % based on said substrates.

22. The nuclear plant according to claim 1, wherein said first and second groups of catalytic elements are constructed from at least one precious metal selected from the group consisting of palladium, platinum, and vanadium on at least one of ceramic substrates or on metal substrates having a ceramic coating, and said first and second groups of catalytic elements contain a precious metal proportion of more than 0.5 wt. % based on said substrates.

* * * * *